United States Patent Office 3,492,125
Patented Jan. 27, 1970

3,492,125
AROMATIC SULFIDE RESINS AS COATINGS
FOR COOKWARE
Gardner C. Ray, Bartlesville, Okla., assignor to Phillips
Petroleum Company, a corporation of Delaware
No Drawing. Filed May 20, 1966, Ser. No. 551,554
Int. Cl. A23l 1/00
U.S. Cl. 99—1                                                                                     5 Claims

ABSTRACT OF THE DISCLOSURE

Household kitchen ware, e.g., cooking utensils made of metal, glass, porcelain, pottery, etc., are coated with aromatic sulfide resins, e.g., poly(p-phenylene sulfide), to reduce food sticking and promote ease of cleaning and provide a coating resistant to chipping or scratching upon contact with relatively hard utensils.

This invention relates to cookware. In another aspect, this invention relates to cookware having a cooking surface coated with an aromatic sulfide resin by dissolving the resin in a solvent, coating a substrate therewith, and evaporating the solvent from solution.

Another aspect of the invention relates to cookware having a cooking surface coated with an aromatic sulfide resin, such as poly(p-phenylene sulfide), by spraying a stream of the polymer particles entrained in a gas such as air against the surface of the article to be coated, said surface being at a temperature above the melting or softening point of the polymer.

In another aspect, the invention relates to cookware having a cooking surface coated with an aromatic sulfide resin such as poly(p-phenylene sulfide) produced by the reaction of polyhalo-substituted aromatic compounds with alkali metal sulfides in the presence of methyl pyrrolidone or a similar polar solvent, as disclosed in Ser. No. 327,143, filed Nov. 27, 1963, a co-pending application, now U.S. 3,354,129.

Glass and metal cookware having cooking surfaces coated with polytetrafluoroethylene have become widely known articles of commerce. The resinous coating serves the important function of preventing or reducing sticking of food to the cooking surface, thus promoting ease of cleaning. However, an undesirable feature of the polytetrafluoroethylene coating is its susceptibility to scratching or chipping upon contact with such utensils as metal forks, knives, spoons, spatulas, and the like. Proper care of such a coating requires that any utensil used therewith be of plastic or other relatively soft composition. Accordingly, it is an object of this invention to provide a cooking surface which resists the adherence of food. It is also an object of this invention to provide a cooking surface which can be easily cleaned. Yet another object is to provide a cooking surface which is resistant to chipping or scratching upon contact with relatively hard utensils such as metal utensils.

Other aspects, objects, and the several advantages of the invention will become apparent from a reading of the disclosure and the appended claims.

In accordance with this invention, a cooking surface made of metal, e.g., iron, steel, aluminum, and the like, or of ceramic, e.g., glass, porcelain, pottery, and the like, on which food is cooked, is coated with an aromatic sulfide resin such as poly(p-phenylene sulfide) to reduce or prevent sticking of food and to promote ease of cleaning. Examples of such cookware include frying pans, cookie sheets, cake and sauce pans, ceramic baking dishes and other surfaces used in cooking.

Aromatic sulfide resins such as poly(p-phenylene sulfide) have good lubricating properties and adhere well to metal, glass, and other surfaces. They are superior to polytetrafluoroethylene in hardness and in resistance to degradation at high temperature. Greater hardness is particularly advantageous in that it obviates the need for special utensils made of nylon and the like which come in contact with the coated cooking surface, for the aromatic sulfide resins are especially resistant to scratching, chipping and denting. Furthermore, cleaning of the coated cookware can be carried out by ordinary dishwashing procedures without fear of damage to the coating.

Poly(p-phenylene sulfide) applied to a glass cooking surface is superior to a polytetrafluoroethylene-coated glass cooking surface because the coefficient of expansion of the sulfide resin more closely approaches that of glass than does the coefficient of expansion of polytetrafluoroethylene. Thus, the stresses produced by repeated heating and cooling are considerably smaller in glass coated with poly(p-phenylene sulfide) than in glass coated with polytetrafluoroethylene.

Although the aromatic sulfide resin can be applied to the cookware in any convenient manner, for example, by fluidized bed techniques, by evaporation of solvent from a solution of the polymer, etc., the preferred method comprises spraying a stream of the polymer particles entrained in a gas such as air against the surface to be coated, while said surface is at a temperature above the melting or softening point of the polymer. The surface is then subjected to a temperature of about 500 to about 900° F., preferably from about 600 to about 850° F., for a period of from about 5 minutes to about 4 hours, preferably from about 15 minutes to about 2 hours, to effect good adhesion of a durable coating of polymer. If a thicker coating is desired, the application of polymer to the surface and subsequent heat treatment can be repeated one or more times. If a smoother surface is desired, the polymer treated surface can be sanded or otherwise abraded prior to or after the post-heat treatment.

The aromatic sulfide resin applied to the cookware should have a softening point above the temperature at which the cookware is to be utilized. Thus, a suitable aromatic sulfide resin will generally have a softening point within the range of about 300 to about 850° F., the softening point of the resin preferably being above 400° F. The pencil hardness of the resin at room temperature will usually be within the range of about 2H to about 6H. The aromatic sulfide resin is generally applied as a coating having a thickness of about 0.5 to about 50 mils or more, the thickness of the coating usually being about 1 to about 30 mils.

It will be apparent to one skilled in the art that the concept of the invention is not limited to the coating of any particular substrate material. Any cooking surface to which an aromatic sulfide resin will adhere can be used in the practice of the invention. Further, any suitable coating technique can be used to coat a substrate material.

Other aromatic sulfide resins which can be used in the practice of this invention include poly(4,4'-biphenylylene sulfide); modified poly(p-phenylene sulfide) which is crosslinked, e.g., as in Serial No. 327,143; polymers containing the recurring unit

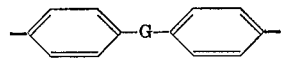

where G is an oxygen atom or an

group, prepared, e.g., as in Ser. No. 327,143; and the like.

EXAMPLE I

An 8-inch cast iron skillet was heated on a hot plate to a temperature above the melting point of the polymer to be applied. Then poly(p-phenylene sulfide), prepared from p-dichlorobenzene and sodium sulfide in a polar solvent, and entrained in a stream of air, was sprayed onto the inner surface of the hot skillet. The coated skillet was then maintained at about 600° F. for 1 hour, after which the coated surface was sanded lightly and abraded with steel wool until a smooth surface was obtained.

A comparison of the above poly(p-phenylene sulfide)-coated skillet with a polytetrafluoroethylene-coated skillet for cooking eggs and potatoes with a small amount of grease showed that the two skillets performed equally well with regard to ease of release of the cooked food from the skillet. However, the poly(p-phenylene sulfide) coating was less susceptible to chipping than was the polytetrafluoroethylene coating.

EXAMPLE II

A 9-inch aluminum skillet was heated on a hot plate, and poly(p-phenylene sulfide) was sprayed on the hot inner surface as in Example I. The skillet was then heated in a furnace at about 600° F. for 1 hour, after which the coating was smoothed by light sanding. Two additional light coats of poly(p-phenylene sulfide) were sprayed on the inner surface, and the skillet was left on a hot plate for 1 hour. The coating was again sanded, after which the skillet was placed in a furnace at 650° F. for 1 hour.

An egg cooked with a small amount of grease in the skillet did not stick to the coating, and bacon was fried with success. The performance of the skillet was comparable to that of the poly(p-phenylene sulfide)-coated cast iron skillet prepared in Example I.

EXAMPLE III

A 9-inch aluminum skillet coated with poly(p-phenylene sulfide) in general accordance with the procedure described in Example II received routine home kitchen use over a period of about 4 months with no special care taken to prevent damage to the surface coating. At the end of this time, the skillet was yet in service, and the poly(phenylene sulfide) coating was still in good condition and functioning well in reducing the extent of sticking of food to the skillet.

Reasonable variation and modification are possible within the spirit and scope of the invention, the essence of which is an article of manufacture consisting of cookware having a cooking surface comprising a substrate coated with an aromatic sulfide resin such as poly(p-phenylene sulfide).

I claim:
1. A method for cooking food on a cooking surface resistant to the adherence of food during cooking of food and resistant to chipping or scratching upon contact with relatively hard utensils which comprises cooking food on a cooking surface of poly(p-phenylene sulfide), poly(4,4'-biphenylylene sulfide), crosslinked poly(p-phenylene sulfide), or polymers containing the recurring unit

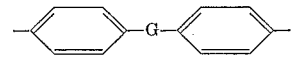

where G is an oxygen atom or an

group, coated on a substrate of metal, ceramic, glass, porcelain or pottery, the thickness of said coating being sufficient to cover said substrate with a cooking surface of said polymers.

2. The method as defined in claim 1 wherein said cooking surface is poly(p-phenylene sulfide) and the thickness of poly(p-phenylene sulfide) coating on said substrate is from about 0.5 to about 50 mils.

3. The method as defined in claim 1 wherein said cooking surface is poly(p-phenylene sulfide) and said metal is iron or aluminum.

4. The method as defined in claim 1 wherein said cooking surface is poly(p-phenylene sulfide) which is produced by the reaction of a polyhalo-substituted aromatic compound with an alkali metal sulfide in the presence of a polar solvent.

5. The method as defined in claim 4 wherein said polyhalo-substituted aromatic compound is p-dichlorobenzene and said alkali metal sulfide is sodium sulfide.

References Cited

UNITED STATES PATENTS

| | | | |
|---|---|---|---|
| 3,282,902 | 11/1966 | Panek | 117—124 XR |
| 3,354,129 | 11/1967 | Edmonds et al. | 260—79 |

ALFRED L. LEAVITT, Primary Examiner

W. F. CYRON, Assistant Examiner

U.S. Cl. X.R.

99—107, 113; 117—123, 124, 127, 161